United States Patent [19]

Duperray et al.

[11] 4,267,237
[45] May 12, 1981

[54] MOLDED PREFORMED POLYTETRAFLUOROETHYLENE STRUCTURES

[75] Inventors: Gilbert Duperray, Lozanne; Andre A. Monnet, Lyons; Claude Tournut, Francheville, all of France

[73] Assignee: Produits Chimiques Ugine Kuhlmann, Courbevoie, France

[21] Appl. No.: 30,736

[22] Filed: Apr. 17, 1979

Related U.S. Application Data

[60] Continuation of Ser. No. 882,881, Mar. 1, 1978, abandoned, which is a division of Ser. No. 671,042, Mar. 29, 1976, Pat. No. 4,102,966.

[30] Foreign Application Priority Data

Apr. 16, 1975 [FR] France .................. 75 11770

[51] Int. Cl.³ .................. B32B 27/00; B29C 3/00
[52] U.S. Cl. .................. 428/422; 264/112; 428/323; 428/325; 428/328; 428/329; 428/330
[58] Field of Search .............. 428/422, 323, 325, 328, 428/329, 330; 264/120, 127, 122, 259, 263, 241, 112, 113, 255, 266

[56] References Cited

U.S. PATENT DOCUMENTS

| | | | |
|---|---|---|---|
| 2,728,698 | 12/1955 | Rudner | 428/422 |
| 2,929,109 | 3/1960 | Cresap | 264/127 |
| 2,951,721 | 9/1960 | Asp | 264/127 |
| 3,060,517 | 10/1962 | Fields | 264/120 |
| 3,235,637 | 2/1966 | Hoffman | 264/127 |
| 3,383,442 | 5/1968 | Mountain | 264/245 |
| 3,459,213 | 8/1969 | Schenck, Jr. | 264/127 |
| 3,537,700 | 11/1970 | Schenck | 264/112 |
| 3,946,136 | 3/1976 | Fitz | 428/422 |
| 4,147,824 | 4/1979 | Dettmann | 428/422 |

Primary Examiner—Ellis P. Robinson
Attorney, Agent, or Firm—Pennie & Edmonds

[57] ABSTRACT

Molded preformed polytetrafluoroethylene structures are comprised of at least one preformed section. The homogeneous PTFE section yields a unitary non-homogeneous polytetrafluoroethylene structure when isostatically molded together with either polytetrafluoroethylene powders or polytetrafluoroethylene preformed sections.

13 Claims, 8 Drawing Figures

MOLDED PREFORMED POLYTETRAFLUOROETHYLENE STRUCTURES

This is a continuation of application Ser. No. 882,881, filed Mar. 1, 1978, now abandoned, which in turn is a divisional application of Ser. No. 671,042 filed Mar. 29, 1976, now U.S. Pat. No. 4,102,966, issued on July 25, 1978.

DESCRIPTION OF THE PRIOR ART

Polytetrafluoroethylene powders, hereinafter referred to as PTFE for convenience, are generally divided into two large families: the so-called "fine" powders for extrusion and granular powders. The fine powders are generally obtained by coagulation of PTFE from a dispersion and are processed into solid objects by paste extrusion or lubricated extrusion. The granular powders are obtained by suspension polymerization of the monomer TFE followed by various grinding or agglomeration treatments which facilitate their handling particularly to form free-flowing granular powders for feeding the powders to a suitable molding device.

In general, because of the enormously high viscosity of liquid or molten PTFE, the granular PTFE powders are processed into solid shapes by molding a given part at ambient temperature at a pressure generally between about 100 and 1000 bars, removing the article from the mold, and then heating the article to ensure that all of the polymer is converted into the amorphous state. In order to accomplish this, the PTFE article is generally heated to between about 350° to 400° C. over a period of time to ensure the amorphous state which will depend on the size and thickness of the PTFE article. The desired mechanical characteristics are brought about by the reorganization of the macromolecules during cooling.

The oldest and simplest form of this technique consists in the molding of solid or hollow blocks from which the finished objects are machined. This method is suitable for simple objects. However, this technique is not suitable for complicated parts whose machining is difficult if not impossible, or which entails a considerable loss of material.

Improved methods have been proposed, particularly the technique known as isostatic molding, in which the mold consists entirely or in part of a material which can be deformed under the effect of pressure, which makes it possible to obtain more exact configurations of the desired part or a very close rough cast thereof. This process has the additional advantage that it compresses the entire object with uniform pressure. After isostatic molding, the PTFE molded part is sintered at a temperature on the order of 360° C. to 400° C.

However, and despite the improvement of the flowability of PTFE granular powders, some complex parts cannot be produced by the known methods, such as isostatic molding, in part owing to the impossibility of achieving a homogeneous filling of the mold.

Moreover, it is difficult, if not impossible, to prepare objects by isostatic molding of PTFE powders of very low particle size, which have very poor flow characteristics and a high rate of swelling but which, on the other hand, produce finished objects of very low porosity.

Finally, it is known that in PTFE molding techniques the method of filling the mold several times with a compression operation between each filling should be avoided, as this leads to parts exhibiting charge lines at the levels of the different fillings.

The applicants have discovered that if the PTFE is molded at a low pressure which, however, is sufficient for the preparation of a preform, the latter may be very effectively welded or molded through subsequent isostatic molding as well as to another preform or to an additional granular PTFE powder.

SUMMARY OF THE DISCLOSURE

The process according to the present invention comprises preforming at a low pressure at least one of the component elements of the part to be produced, then placing the preformed component element or elements in a mold designed for isostatic molding, with or without an additional complement of granular PTFE powder. After isostatic molding, the part is removed off the mold and sintered under the usual conditions at a temperature of 360° to 400° C., more particularly between 365° and 380° C., with heating and cooling programmed as a function of the wall thickness as in conventional molding of PTFE.

The present invention relates to granular PTFE powders. PTFE powder have historically been divided into two large categories, the so-called "fine" powders which are used for extrusion purposes, commonly with a volatile extrusion aid, and the granular powders. These two different types of powder have not historically been distinguished by their physical properties, such as their particle size, apparent density, etc., but rather by the process by which the powders are produced.

The "fine" powders are generally defined in literature patents and standards as those obtained by coagulation of PTFE powders from a dispersion, while granular powders have been defined as those obtained by suspension polymerization of the TFE monomers. These granular PTFE powders are generally subjected to various grinding or agglomeration treatments to facilitate their moldability and flow properties. Due to the subsequent treatment of the granular PTFE, the average particle size and apparent densities can range quite widely.

Granular PTFE powders are defined, for example, in ASTM designation D1457-75 as type I and II and the so called "fine powders" as type III in the same ASTM designation.

The term granular PTFE as used herein also includes the so-called "free-flowing" granular PTFE powders, which are, in essence, granular PTFE powders subjected to various treatments to improve their flowability.

The term PTFE granular powders as used herein also include granular powders of the homopolymers of tetrafluoroethylene as well as granular powders of tetrafluoroethylene copolymers of low comonomer content (preferably less than 5% comonomer) which are generally processed in the same manner as tetrafluoroethylene homopolymers. Some examples of such granular PTFE copolymers include such copolymers as tetrafluoroethylene and hexafluoropropene or perfluorinated vinyl ethers.

In the preforming phase the pressure applied is an important parameter. If the preforming pressure is too low, e.g., less than about 10 bars, the preform is too brittle and risks being broken during subsequent manipulations. If the preforming pressure is too high, the preforms exhibit the well-known defects reported previously, namely that they can no longer cohere to one another or to powder.

The appropriate preforming pressures will vary somewhat to accomplish the purpose of this invention depending in part on the type of powder used, whether filled or unfilled, etc., but is generally between 10 and 50 bars, preferentially between about 20 and 30 bars. In the case of granular powders of particle size below 100μ it is preferred to use a pressure of approximately 20 bars, while in the case of granulated powders of the free-flowing type it is more preferable to use a pressure near 30 bars. The equipment used for preforming is conventional and known by all persons skilled in the art of PTFE molding.

The molds for isostatic molding are known per se. One type of such a mold has been described, e.g., in U.S. Pat. No. 2,929,109. The mold should be designed in such a way that the pressure is applied as uniformly as possible over the preform or preforms and the powder which may be additionally used. This pressure used in the isostatic molding also depends on the nature of the PTFE powder used; it ranges between 100 and 1000 bars, preferably between about 150 and 350 bars for unfilled PTFE powders, and between about 250 and 500 bars for filled PTFE powders.

The term "filled PTFE" refers to mixtures of PTFE powders of the type defined above with inert fillers. Suitable inert fillers for PTFE powders are well known and may be fibrous, such as glass fiber, or powdered, such as coke dust, graphite, powdered metals of metal oxides.

The duration of compression step for both preforming and isostatic molding depends essentially on the dimensions of the parts to be produced, and may be readily determined by a person skilled in the art. This duration may vary from a few seconds to several-dozen minutes, depending on the size of the part to be prepared.

According to one preferred mode of practicing the method of the invention, a preform is prepared under the above-described conditions, then placed in the mold designed for isostatic molding together with a complement or filled or unfilled granular PTFE powder. After isostatic molding the finished part is removed out the mold and sintered in known manners.

According to another preferred mode of practicing the method of the invention, a minimum of two preforms are prepared under the above-described conditions, then placed in the mold designed for isostatic molding in such a way that the parts of the preforms to be welded or molded to each other are in contact. After isostatic molding the unitary finished part is removed out the mold and sintered.

A third preferred mode of practicing the method of the invention involves preparing at least two preforms under the above-described conditions, then placing them in the mold designed for isostatic molding in such a way that the parts of the preforms to be welded or molded together are connected together by a filled or unfilled granular PTFE powder. After isostatic molding the unitary finished part is removed out the mold and sintered.

One of the advantages of the method according to the invention is that it makes possible the welding or molding together of homogeneous PTFE preformed sections which are non-homogeneous with respect to each other, e.g., preforms of free-flowing PTFE powders with preforms of PTFE fabricated from granular powders having a particle size of less than 100μ. It is also possible to combine filled preforms with unfilled preforms, or even preforms filled with different fillers, for the same finished object.

The present invention finds numerous industrial applications in the production of complex parts. It is of particular use in the fabrication of parts comprising several identical elements, e.g., bellows, insulators, etc. and where different PTFE products are desired in a single assembly.

Figure 1:
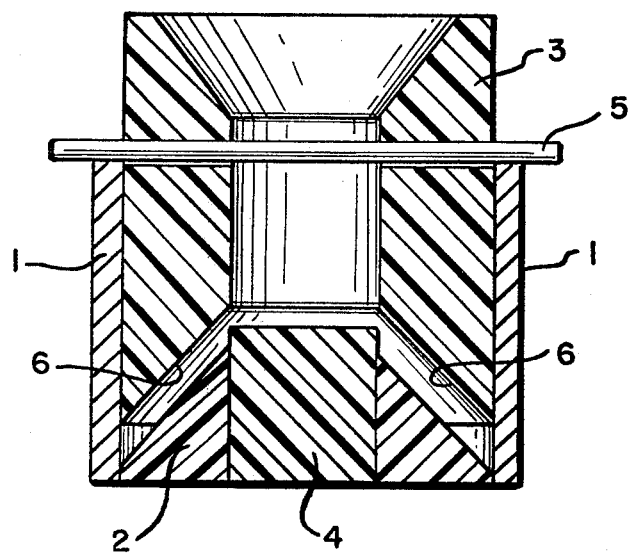
FIG. 1 is a cross-sectional view of a mold.
Figure 4:
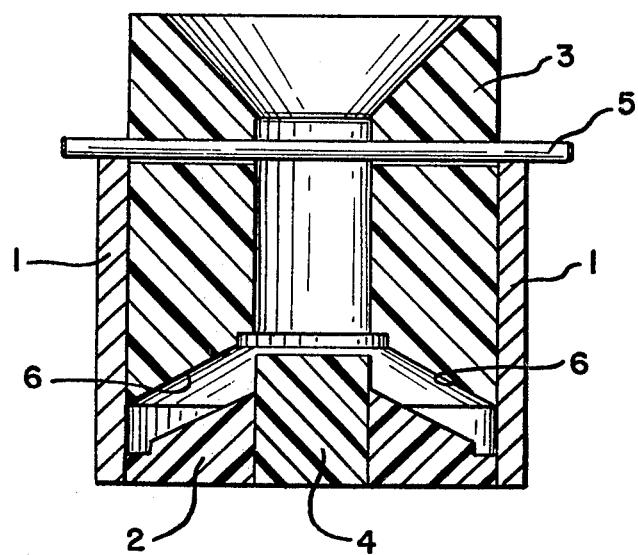
FIG. 4 and FIG. 6 are cross-sectional views of additional molds.
Figure 6:
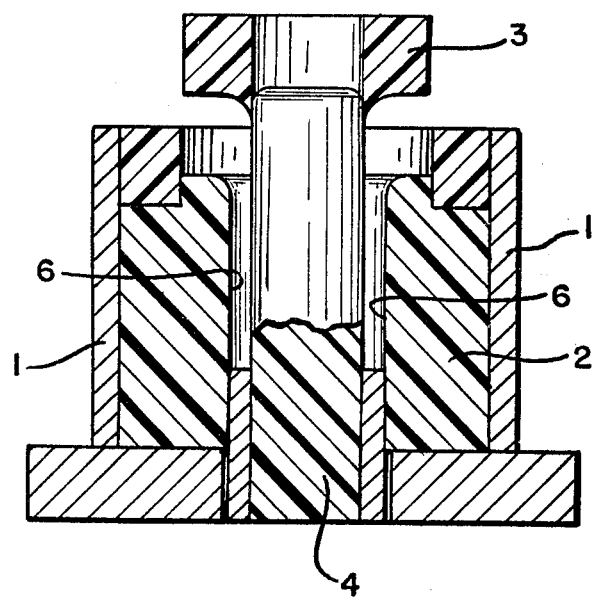

In FIGS. 1, 4 and 6 the rigid cylinders 1 are made of ordinary steel. The lower pistons 2 are made of rigid polyvinylchloride (rigid PVC). The upper piston 3 and the punch 4 are also made of rigid PVC. The rods 5 are used to maintain the piston 3 at a predetermined distance from the lower piston 2. FIG. 6 indicates the cavities to be filled with the granular PTFE powder.

Figure 2:
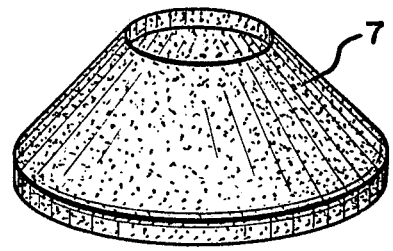
FIG. 2 is a representation of a PTFE preform produced in the mold of FIG. 1.
Figure 3:
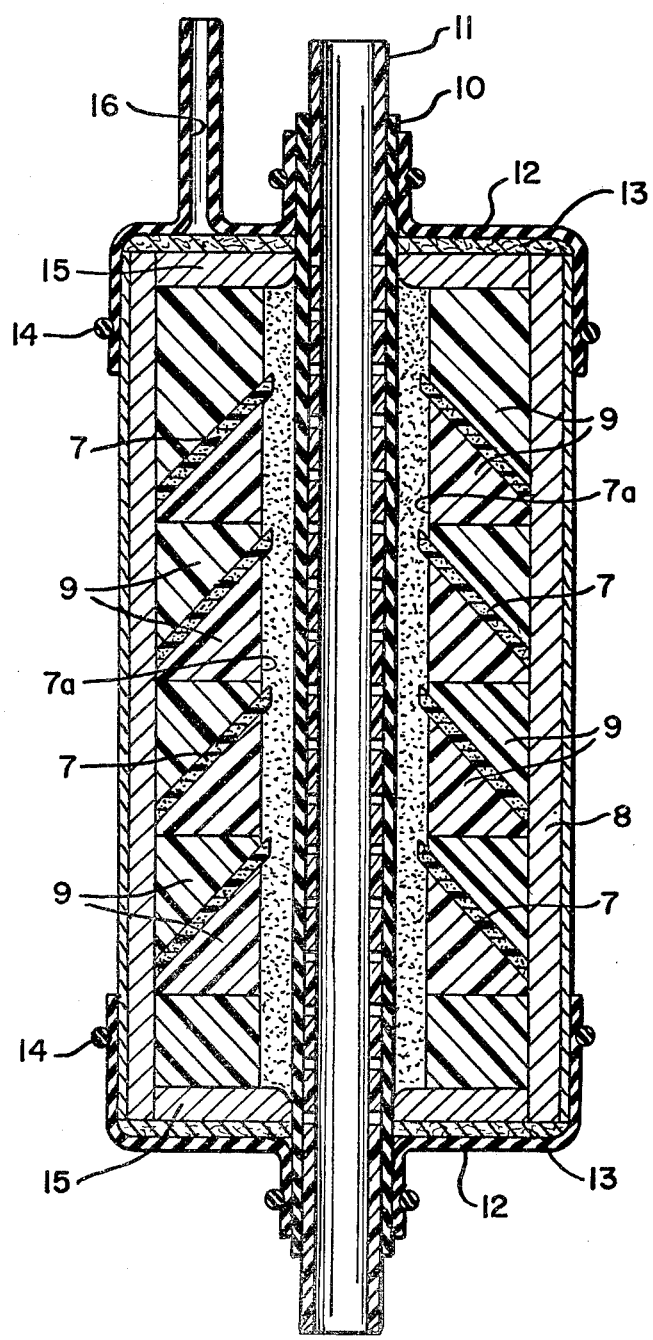
FIG. 3 is a cross-sectional view of an isostatic mold in which the preforms of FIG. 2 are isostatically molded together with additional PTFE powder.

FIG. 3 illustrates an example or an isostatic mold. The mold comprises a rigid cylinder 8 made of ordinary steel. The spacers 9 are of a half-shell shape made of rigid PVC designed to maintain the preforms 7 of FIG. 2 in position. As noted in the drawing, the preforms extend beyond the spacer inwardly into the cavity 7a. 10 is a flexibly central membrane of approximately 1 mm in thickness made of natural rubber and having a Shore A hardness of 30 and supported by a preforated PVC tube 11, which is centered by rings 15.

The ends of the mold, depicted in FIG. 3, are closed by flexible membranes 12. Tightness is insured by rubber bracelets 14 and a felt 13 is inserted in the mold to insure better degassing and to protect the membranes 12 from being stamped.

The other end of the mold can be similarly closed, after insertion of the preforms, and the assembly for the mold placed under vacuum through the orifice 16 provided for this purpose.

Figure 8:
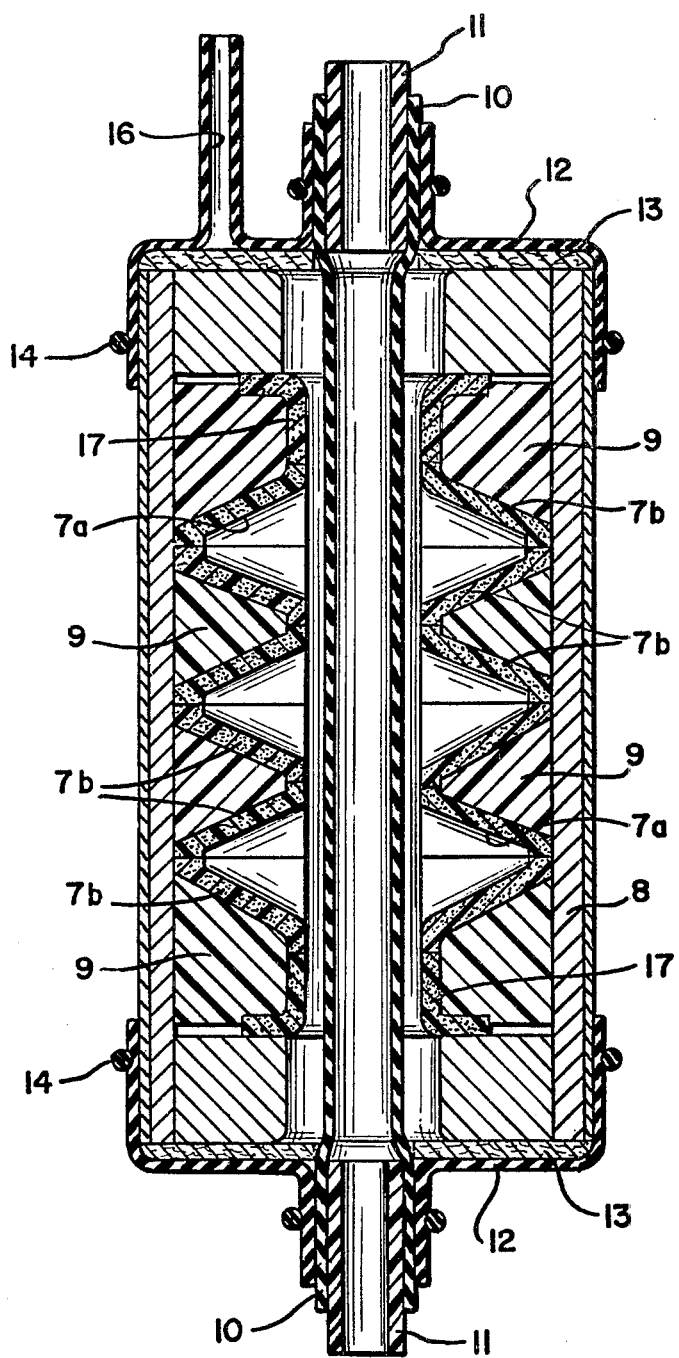
FIG. 8 shows another isostatic mold in which the molding or welding together of preforms such as produced with the molds of FIGS. 4 and 6 is accomplished.

FIG. 8 represents the same type of isostatic mold as in FIG. 3, with the exception of the mode of operation, which is somewhat different than that in FIG. 3. The preforms 17 and 7b are placed in contact with each other so that they can be molded or welded together without any additional powder in the cavity 7a in FIG. 8, as is depicted in cavity 7a in FIG. 3.

The invention is defined more clearly by means of the following illustrative and non-limiting examples:

EXAMPLE 1

In this example insulators consisting of a large number of elements are produced in a single molding operation yielding a single homogeneous product exhibiting throughout the excellent mechanical and electrical characteristics of molded PTFE.

The equipment used in this example is shown for FIGS. 1 and 3.

The cavity 6 in FIG. 1 is filled with an excess of granular free-flowing PTFE powder having an average particle size of approximately 400 microns and an apparent density of approximately 0.830, marketed by Produits Chimiques Ugine Kuhlmann under the trademark SOREFLON 8G POWDER.

After the cavity 6 is filled with the excess granular PTFE powder, the rod 5 is withdrawn and the powder is compressed at ambient temperature at a pressure of 30 bars for 30 seconds. The preform thus fabricated in the mold of FIG. 1 is then demolded producing the truncated conical PTFE preform 7 shown in FIG. 2.

These preforms 7 are then placed between the spacers 9, as shown in FIG. 3. The spacers 9 maintain the preforms 7 in position and the preforms are positioned to extend beyond the spacers 9 inwardly toward cavity 7a by approximately 1 mm when placed in the mold of FIG. 3. After the preforms 7 have been stacked between the spacers 9, the assembly comprising the spacers 9 and preforms 7 are introduced into the rigid isostatic mold of FIG. 3 and one end is closed with the ring 15, a felt 13, and the flexible membrane 12. The central membrane 10 is positioned on its perforated support 11 and inserted into the mold, and the space 7a between this membrane and the spacers 9 is filled with additional SOREFLON 8G POWDER.

The other end of the mold of FIG. 3 is closed in the same manner described above for the first end and the assembly is placed under a vacuum through the orifice 16 provided for this purpose. The entire assembly is then placed in a tank filled with water whose pressure is increased to 250 bars over a period of 2 minutes. This pressure is then maintained for a period of 5 minutes and then gradually decreased to atmospheric pressure in 3 minutes.

During the application of this pressure, the additional PTFE powder is compressed against the spacers 9 and the ends of the preforms and also by the membranes 12.

To demold, the membranes 12 and 10 are removed, the assembly taken out of the rigid mold 8 and the spacers 9 removed one by one.

The unitary mold assembly or part is then placed in an oven at 340° C. for one hour. The temperature is then raised to 380° C. and maintained at this temperature for an additional hour and then decreased to 300° C. After a half hour the molded parts are then removed and cooled on a suitable mandrel.

The cohered parts have the following dimensions:
Outside diameter of central tube: 36 mm
Outside diameter of fins: 98 mm
Thickness of fins: 2.6 mm
Distance between fins: 30 mm

EXAMPLE 2

Example 1 is repeated using the same equipment and the same SOREFLON 8G POWDER, except that the powder compressed in the mold of FIG. 1 is carried out at three different preforming pressures, namely 10 bars, 30 bars and 50 bars. At 10 bars pressure the preform is too fragile and cumbersome as it is handled during its placement in the mold of FIG. 3. At 30 bars a very good consolidation or welding of the powder particles is obtained in the preform and also between the preform and the powder when subjected to the isostatic molding step in the mold of FIG. 3.

At a pressure of 50 bars, the welding of the premold and the preform to the powder is apparently good, but one out of two fins show poor adhesion of the powder to the preform.

It might be noted here in this particular example that the preparation of the preform at 10 bars does not appear to produce satisfactory results, and that the preparation of the preform at 50 bars is somewhat questionable. The use of PTFE powders other than or in addition to the specific SOREFLON 8G POWDER used in this example may very well produce satisfactory products at these premolding pressures.

EXAMPLE 3

Example 1 was again repeated using the same mold as shown in FIG. 1 except that the rigid PVC parts are replaced by brass parts and the PTFE powder used for preforming the elements in a granular PTFE powder having a grain size of less than 100 microns, specifically about 35 microns, and an apparent density of approximately 0.450, and filled with 20% by weight α-alumina. This product is marketed by Produits Chimiques Ugine Kuhlmann under the trademark SOREFLON 7A 20. The additional powder inserted in the cavity 7a in the mold of FIG. 3 is SOREFLON 8G.

The preforming pressure to produce the preforms in the mold of FIG. 1 is 30 bars and the pressure used during the isostatic molding is 350 bars. All other conditions are identical to those of Example 1.

An excellent bond is obtained between fins (that portion of the preforms 7 extending beyond the spacers 9 into the cavity 7a of the PTFE preforms filled with α-alumina and the SOREFLON 8G POWDER inserted in the cavity 7a.

EXAMPLE 4

Figure 5:
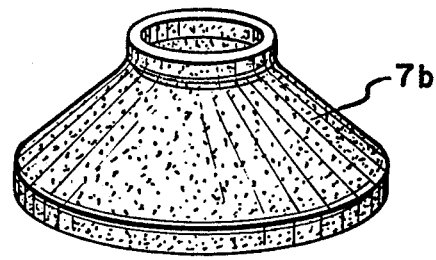
FIG. 5 and FIG. 7 depict preforms which can be produced by the molds of FIGS. 4 and 6.
Figure 7:
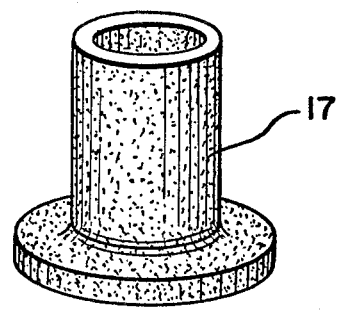

Preforms are prepared by filling the cavities of the molds shown in FIGS. 4 and 6, in the same manner as in Example 1 to produce 2 different elements or preforms 7b and 17, shown in FIGS. 5 and 7.

These different preforms are then arranged in the isostatic mold as shown in FIG. 8. The preforms arranged in the mold 8 are supported by spacers 9 with the preforms 7b constituting the central part of the bellows and the preforms 17 the ends.

A 1 mm thick flexible membrane of natural rubber, 10, of a Shore A hardness of 30, is maintained at the ends by PVC tubes 11. The ends of the mold are closed by flexible membranes 12 maintained by bracelets 14, as described in Example 1.

After the preforms 7b and 17 have been positioned in the mold, no additional PTFE powder is added. The assembly is placed in a vacuum through the orifice 16 and the entire assembly placed in a tank filled with water whose pressure is raised to 250 bars. As a result of this pressure the membrane 10 is pressed against the interior of the preforms 7b and 17 compressing the same. The ends of the preforms are also compressed by the flexible membrane 12 through the intermediary of spacers 9. The bellows is demolded and sintered under the same conditions set forth in Example 1.

All of the preforms 7b and 17 show excellent cohesion to one another.

EXAMPLE 5

Example 1 is repeated in which SORFLON 7 POWDER, which is a granular PTFE powder having a particle size of less than 100 microns (more specifically an average particle size of about 35 microns and an apparent density of about 0.450) is used. The preforming pressure used in the mold shown in FIG. 1 is 20 bars, and the pressure used during the isostatic mold in FIG. 3 is 150 bars. All other conditions being the same as that set forth in Example 1.

All of the elements of the finished part show excellent cohesion to one another.

We claim:

1. A composite, complex, molded granular polytetrafluoroethylene product made from the method comprising:
   a. compressing granular polytetrafluoroethylene powder at a pressure between about 10 and 50 bars to cohere the granules into a consolidated preform,
   b. placing the preform in contact with additional polytetrafluoroethylene granules in an isostatic mold, and
   c. subjecting the preform in step (b) to isostatic molding at a pressure between about 100 and 1000 bars to cohere the preform and the additional granules into a complex, molded, composite structure.

2. The product according to claim 1 wherein at least two preforms are produced and at least one of the preforms is placed in the isostatic mold in contact with at least one other preform and the preforms molded together into a unitary structure in the isostatic mold.

3. The product according to claim 1 wherein the preform is placed in the isostatic mold together with a second spaced preform and additional polytetrafluoroethylene powder, and the preforms and additional powder molded together into a unitary structure in the isostatic mold.

4. The product according to claim 1 wherein the isostatic molding pressure is between about 150 and 500 bars.

5. The product according to claim 4 wherein the preforms are produced at a pressure between about 20 to 30 bars.

6. The product according to claim 5 wherein the inert fillers are added to the polytetrafluoroethylene powders.

7. The product according to claim 1 wherein an inert filler is added to the polytetrafluoroethylene powder.

8. The product according to claim 2 wherein at least one of the preforms is formed from a polytetrafluoroethylene different from at least one of the other preforms.

9. The product according to claim 3 wherein the preform and additional powder are composed of different polytetrafluoroethylenes.

10. The product according to claim 3 wherein at least one of the preforms is filled with an inert filler and is molded together in the isostatic mold with an unfilled preform.

11. The product according to claim 3 wherein either the additional powder or the preform is filled with an inert filler and the other unfilled.

12. The product according to claim 2 wherein at least two of the preforms are filled with different inert fillers and the preforms containing the inert fillers are molded together in the isostatic mold to form a unitary structure.

13. The product according to claim 3 wherein both the powder and the preforms are filled with different inert fillers.

* * * * *